United States Patent [19]
Foote et al.

[11] Patent Number: 5,269,295
[45] Date of Patent: Dec. 14, 1993

[54] AIRCRAFT AIRCREW LIFE SUPPORT APPARATUS

[75] Inventors: James C. Foote; Michael W. Harral; Peter J. Rowland, all of Yeovil, England

[73] Assignee: Normalair-Garrett (Holdings, Ltd.), England

[21] Appl. No.: 667,229

[22] Filed: Mar. 11, 1991

[30] Foreign Application Priority Data

Mar. 13, 1990 [GB] United Kingdom ............... 9005562

[51] Int. Cl.$^5$ .......................................... A61M 16/00
[52] U.S. Cl. ...................... 128/204.18; 128/204.26; 128/205.24
[58] Field of Search .................. 128/202.11, 202.12, 128/204.18, 204.26, 205.24

[56] References Cited

U.S. PATENT DOCUMENTS 4,230,097 10/1980 Beaussant et al. ................ 600/19
4,858,606 8/1989 Hamlin ........................... 128/204.29

Primary Examiner—Edgar S. Burr
Assistant Examiner—Aaron J. Lewis
Attorney, Agent, or Firm—Larson & Taylor

[57] ABSTRACT

A breathing demand regulator for use in aircrew life support apparatus has an aneroid capsule 56 coacting with a valve head 50 to restrict outflow from a breathing pressure control chamber 32. The aneroid capsule expands to move the valve head in the event of aircraft cabin altitude rising above a predetermined level due to loss of cabin pressure. An end face 53 of a valve stem 51 supporting the valve head senses inflation pressure of an aircrew G-suit by way of a passageway 59 for movement of the valve head in the presence of G-load. This arrangement provides for increased control pressure and, hence, increased breathing gas pressure in a regulator outlet 13, in meeting the higher of requirements for positive pressure breathing to protect an aircrew member exposed to both G-load and high aircraft ambient altitude (say above 12000 meters). The regulator is disclosed in combination with an anti-G valve arrangement 90, 100 and a G-suit inflation control valve arrangement 60, 61 and 120, 121 that provides the higher of G-suit inflation pressure requirement for protecting the aircrew member when exposed to high aircraft ambient altitude in the presence of G-load.

11 Claims, 4 Drawing Sheets

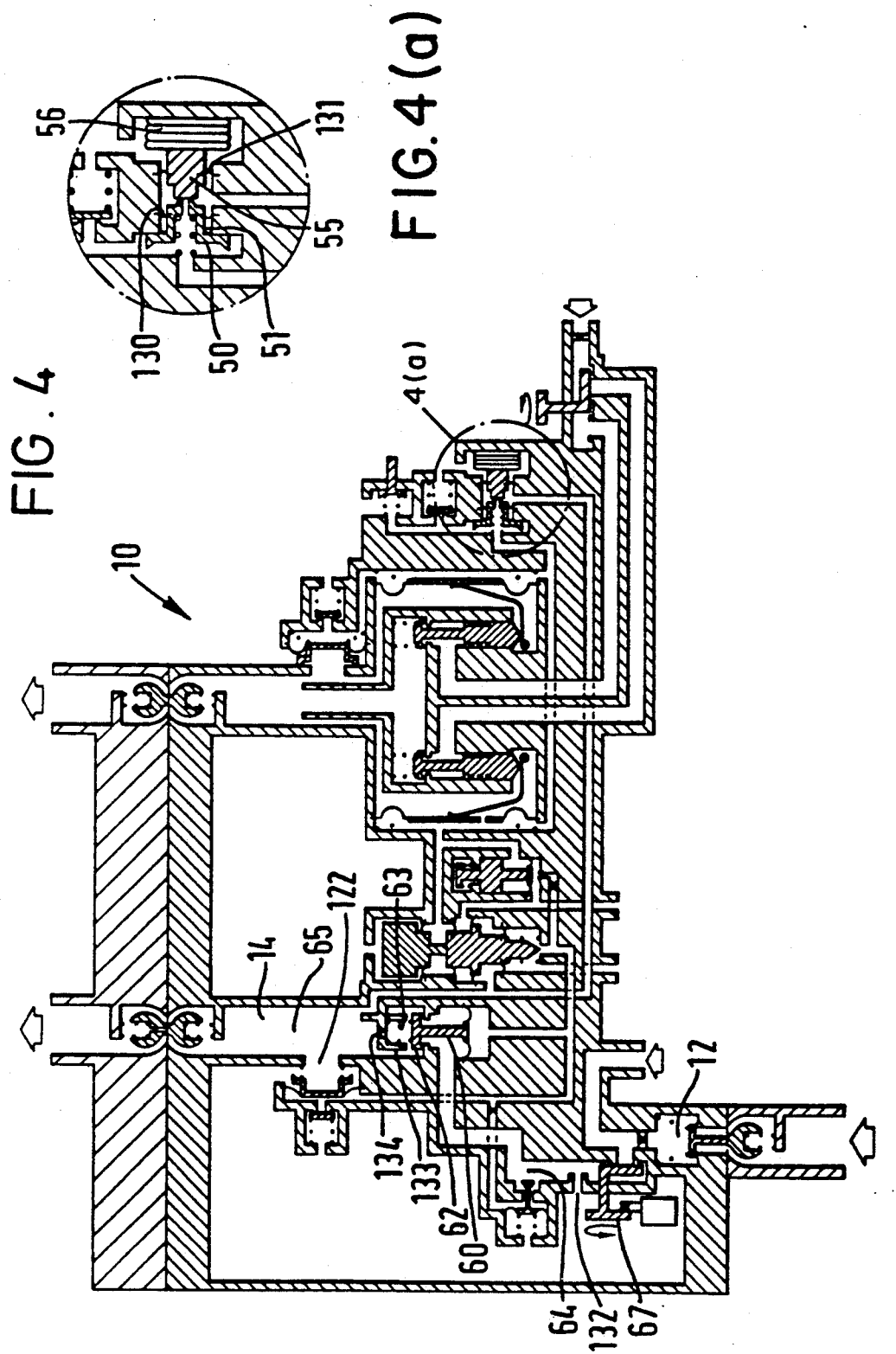

AIRCRAFT AIRCREW LIFE SUPPORT APPARATUS

BACKGROUND OF THE INVENTION

1. Field of the Invention

This invention relates to an aircraft aircrew life support apparatus and is particularly concerned with a breathing demand regulator which when used in combination with a G-protection trousers garment inflation pressure control system meets requirements for protection of an aircrew member exposed to G-load and/or high altitude.

2. Description of the Prior Art

The enhanced agility of modern high performance aircraft designs give such aircraft the ability to perform very highly accelerative manoeuvres both at low altitude and at high altitudes, e.g. in excess of 12,000 meters (40,000 ft). To take advantage of this agility an aircrew member flying the aircraft must be protected against G-induced loss of consciousness, known as G-loc, as well as the effect of exposure to high altitude in the event of loss of cabin pressure. In this regard, unless otherwise specified, references to altitude are to be understood as references to the altitude equivalent to the pressure within an enclosure or cabin within which an aircrew member is situated and which is usually pressurised in relation to the external ambient pressure with the consequence that "cabin altitude" is related to but usually less than the actual altitude of the aircraft.

The partial pressure of oxygen in air decreases with increasing altitude (decreasing total pressure) so that the concentration of oxygen in breathing gas supplied to the aircraft aircrew member must be increased with increasing cabin altitude to maintain the oxygen partial pressure above the minimum value necessary for it to be able to diffuse through the lung tissue and pass to the haemoglobin or red corpuscles in the blood. If, at aircraft operating altitudes above 12000 meters, there is total or partial loss of cabin pressure which causes cabin pressure to fall below 12000 meters equivalent pressure then the overall pressure of the breathing gas delivered to the aircrew member must be increased to a value above cabin ambient pressure so that the minimum critical oxygen pressure is maintained in the lungs, this being referred to as positive pressure breathing (PPB).

Positive pressure breathing at high altitude is aided by exerting pressure around the chest to assist the aircrew member in exhaling used gas from his lungs against the positive pressure in his breathing mask and to enable breathing to be sustained until the aircraft has descended to 12000 meters or below. To meet this requirement the aircrew member wears an inflatable counter-pressure garment ("jerkin") around his chest and back area which is inflated to the same pressure as the pressure in the breathing mask during positive pressure breathing, conveniently by being connected for inflation by breathing gas delivered to the breathing mask.

To counter the effects of high G-load the aircrew member wears an inflatable G-protection trouser garment ("G-suit") which is inflated from a source of high pressure gas, such as engine bleed air. Inflation of the trouser garment may be in response to signals from one or more accelerometers located in the aircraft for sensing accelerative forces, or in response to movement of an inertia mass provided as part of an inflation control valve assembly. When inflated, the trouser garment restricts the flow of blood into the lower extremities of the body where it tends to be forced under the action of the G-load to which the aircrew member is subjected.

It has been found that protection against G-loc is further enhanced by providing positive pressure breathing during periods when high G-loads are being experienced. The increase in breathing pressure causes an approximately equal increase in heart level blood pressure thereby increasing the flow of blood to the brain.

At altitudes which demand positive pressure breathing it is advantageous to inflate the trouser garment to a pressure three to four times that of the pressure in the breathing mask even at times when aircraft flight manoeuvres are not such as to give rise to high G-load. This inflation of the trouser garment counteracts the tendency for blood to be forced into the lower extremities of the body by the high pressure in the lungs and by the counter-pressure garment, which reduces the circulation of blood from the heart to the brain. However, when both altitude and G-load conditions give rise to a requirement for positive pressure breathing, it is considered now that the trouser garment should be inflated to a pressure appropriate to the higher of the prevailing G-load or altitude signals.

Breathing demand regulator and garment inflation pressure control apparatus disclosed in EP-A-0,000,312 and corresponding U.S. Pat. No. 4,230,097 (Intertechnique) has an inertia body movably responsive to acceleration along a predetermined direction for increasing the inflation pressure in a trouser garment when an acceleration in excess of 2G is sensed. The apparatus further includes an aneroid capsule which is responsive to prevailing aircraft cabin pressure for setting a pressure in the trouser garment at a predetermined aircraft operating altitude. As described the apparatus is particularly suited for use with a liquid oxygen breathing system having a converter for supplying gaseous oxygen to the apparatus. The garment inflation pressure control part of the apparatus includes an ejector which is driven by the high pressure gaseous oxygen to induce ambient air into the apparatus for use as garment inflation supply air. This arrangement is wasteful of oxygen and is not suited for use with breathing systems which supply oxygen-enriched breathable gas at lower pressures than liquid oxygen systems.

A further disadvantage of the apparatus as generally disclosed by this reference is to be found in the arrangement of inertia mass and the aneroid capsule. This is such as to isolate the inertia mass signal at altitudes at which the aneroid capsule is effective so that the pressure in the trouser garment is that set by altitude when a higher pressure may be required for protection against G-load.

This disadvantage applies also to a disclosure in the reference for obtaining positive pressure breathing in the presence of G-load and at altitudes in excess of 12,000 meters.

An embodiment disclosed by the reference that does not have the aforementioned disadvantage has the inertia mass and the aneroid capsule arranged in series such that their effect in setting the trouser garment inflation pressure is additive. This does not satisfy the requirement that inflation of the trouser garment must be to a pressure appropriate to the higher of the prevailing G-load or altitude signals.

It is common practice now to provide oxygen-enriched air as breathing gas for an aircrew member of a high performance aircraft from an on-board oxygen generating system (OBOGS) which includes molecular sieve beds comprising zeolite material suited to the retention of nitrogen whilst permitting oxygen to pass through the beds.

A problem with respect to demand valve operation in a breathing regulator suitable for accommodating the lower range of breathing gas pressure available from an OBOGS is overcome by a breathing regulator disclosed in EP-A-0,263,677 (Normalair-Garrett) which provides positive pressure breathing when the cabin altitude exceeds 12,000 meters and, also, when high G-loads are being experienced. Above 12,000 meters cabin altitude, an aneroid valve expands to increasingly restrict the flow of gas from a breathing-pressure control chamber so that pressure in this control chamber increases thereby increasing the pressure of the breathing gas at the regulator outlet to which both breathing mask and counter-pressure garment or jerkin are connected.

When the aircrew member is subjected to high G-loads, i.e. between 3.5 G and 9 G, a further valve regulating outflow from the breathing-pressure control chamber is signalled pneumatically by an anti-G valve to move towards increasingly restricting outflow of gas from the breathing-pressure control chamber so that pressure in that chamber increases to provide (increased) positive pressure breathing in the event that the cabin altitude is below that at which the same degree of positive pressure breathing would be provided. The anti-G valve is an electro-pneumo-mechanical device that controls a supply of inflation air to the G-suit in accordance with sensed G-loads and the signal to the further valve of the demand regulator is obtained by tapping the inflation air line from the anti-G valve to the G-suit.

Whilst individual operation of each of the aneroid valve and the anti-G valve disclosed by EP-A-0,263,677 is satisfactory, the disclosed arrangement of these valves is such that the requirement for positive pressure breathing to be set by the higher of the G-load and altitude signals is not met.

SUMMARY OF THE INVENTION

It is therefore an object of the present invention to provide a breathing demand regulator meeting the requirement for positive pressure breathing to be set by the higher of a G-load signal and an altitude signal.

It is another object of the invention to improve upon the system of EP-A-0,000,312 and corresponding U.S. Pat. No. 4,230,097 by incorporating a breathing demand regulator having characteristics which provide the higher of positive pressure breathing requirements for protection against G-load and exposure to high altitude.

It is a further object of the invention to provide an aircraft aircrew life support system which delivers the higher of requirements for positive pressure breathing and the higher of requirements for G-suit inflation pressure to protect an aircrew member exposed to altitudes above in the order of 12000 meters (40,000 ft) and in the presence of positive G-load.

Accordingly, in its broadest aspect, the present invention provides an aircraft aircrew breathing demand regulator adapted to be connected with a breathing gas source for regulating delivery of breathing gas to a breathing mask in response to breathing demands of the aircrew member, the breathing regulator including a breathing-pressure control chamber fed with gas to develop a control pressure therein determining the breathing gas pressure delivered by the regulator, aneroid means for controlling outflow from the control chamber to increase breathing gas delivery pressure appropriate to positive pressure breathing above a predetermined aircraft cabin altitude, and valve means for controlling outflow from the control chamber to increase breathing gas delivery pressure appropriate to positive pressure breathing in the presence of high or rapidly changing G-load, the aneroid means coacting with the control chamber outflow control valve means such that in the presence of G-load above said predetermined aircraft cabin altitude the outflow control valve means is moved to control outflow from the control chamber to increase breathing gas delivery pressure appropriate to protection against the higher of the altitude and G-load requirements.

Preferably the outflow control valve means comprises a valve head which is in-line or in series with the aneroid means so as to be moved by expansion of the aneroid means towards restricting outflow from the control chamber.

In an embodiment of the invention the valve head is carried by a valve stem having an end face opposite the valve head adapted for communication with a pneumatic signal representative of inflation pressure in a G-suit worn by the aircrew member. The aneroid means may be adapted to act on the end face of the valve stem for movement of the valve head at altitude causing expansion of the aneroid means, and in a particular embodiment of the invention, the aneroid means acts on the valve stem through a loading member.

A breathing demand regulator in accordance with the present invention when used in an aircraft aircrew life support system requires a pneumatic signal representative of G-suit inflation pressure for its operation in providing positive pressure breathing in the presence of G-load.

Accordingly, in another aspect of the present invention an aircraft aircrew life support system comprising a breathing demand regulator adapted to be connected to a breathing gas source for regulating delivery of breathing gas to a breathing mask in response to breathing demands of the aircrew member, and, if required, to a chest counter-pressure garment, the regulator including a breathing-pressure control chamber fed with gas to develop a control pressure therein determining the breathing gas pressure delivered by the regulator, aneroid means for controlling outflow from the control chamber to increase breathing gas delivery pressure appropriate to positive pressure breathing above a predetermined aircraft cabin altitude, and valve means for controlling outflow from the control chamber to increase breathing gas delivery pressure appropriate to positive pressure breathing in the presence of high or rapidly changing G-load, the aneroid means coacting with the control chamber outflow control valve means such that in the presence of G-load above said predetermined aircraft cabin altitude the outflow control valve means is moved to control outflow from the control chamber to increase breathing gas delivery pressure appropriate to protection against the higher of the altitude and G-load requirements; anti-G valve means and G-suit inflation pressure control means responsive thereto for outputting inflation gas to the G-suit; and means for outputting a pneumatic signal representative of G-suit inflation pressure to the valve means controlling outflow from the breathing pressure control chamber for movement of the valve means in the presence of G-load.

Whilst the anti-G valve and G-suit inflation pressure control means are preferably disposed in an single integrated unit with the breathing regulator, they may be provided as separate units connected by a suitable link for outputting pneumatic signals to the breathing regulator.

The anti-G valve means may comprise first anti-G valve means including an inertia mass responsive when G-load exceeds a predetermined level to cause rapid inflation of the G-suit to a first pressure and second anti-G valve means including an inertia mass responsive to increasing G-load for controlling G-suit inflation pressure to increase at a steady rate with increasing G-load above said predetermined level.

Means may be provided for applying breathing regulator control chamber pressure to the first and second anti-G valve means for inflation of the G-suit in the absence of G-load above said predetermined aircraft cabin altitude, whereby said pressure acts to null the effect of the inertia mass of the second valve means when the requirement for protection against altitude is higher than for protection against G-load.

The first and second anti-G valve means may control servo-pressure of a servo-valve arrangement controlling inflation of the G-suit.

The servo-valve arrangement may comprise an inflation gas flow control valve member adapted for opening under the action of servo-pressure to communicate an inflation gas inlet with an inflation gas outlet whereby inflation gas flows to the outlet for inflation of a G-suit connected to the outlet, and a G-suit vent valve member adapted for closing under the action of servo-pressure with a vent port in the outlet whereby when the vent valve member is in an open position the G-suit is vented to atmosphere.

In one embodiment of the invention first anti-G valve means comprises a valve member carried by a diaphragm, an inertia mass biased by a spring to off-load the valve member below the predetermined level of G-load at which the G-suit is inflated, and means for sensing breathing regulator control chamber pressure on that side of the diaphragm facing the inertia mass.

The valve member may be provided as a separate component from the inertia mass which may project a spigot into contact with one face of the valve member or, alternatively, the valve member may be integral with the inertia mass.

The second anti-G valve means may comprise a valve member supported by a plurality of diaphragms and having a valve head at one end thereof, an inertia mass supported by a diaphragm and adapted for acting against an end face of the valve member opposite the valve head for movement of the valve member under influence of increasing acceleration, means for sensing breathing regulator control chamber pressure in a chamber defined between the inertia mass supporting diaphragm and an end one of the valve member supporting diaphragms, a spring acting to bias the valve member towards an open position and means for sensing G-suit inflation pressure and for using this pressure as a feedback force for movement of the valve member in opposition to the resultant of the inertial force on the inertia mass and the force applied by pressure in the chamber defined between the inertia mass supporting diaphragm and the end one of the valve member supporting diaphragms.

BRIEF DESCRIPTION OF THE DRAWINGS

The invention will now be further described by way of example with reference to the accompanying drawings in which:

FIG. 4 is a modified form of the apparatus shown in FIG. 1, and FIG. 4a is an enlarged view of the identified portion of FIG. 4.

DETAILED DESCRIPTION OF THE DRAWINGS

Figures 1, 1A:
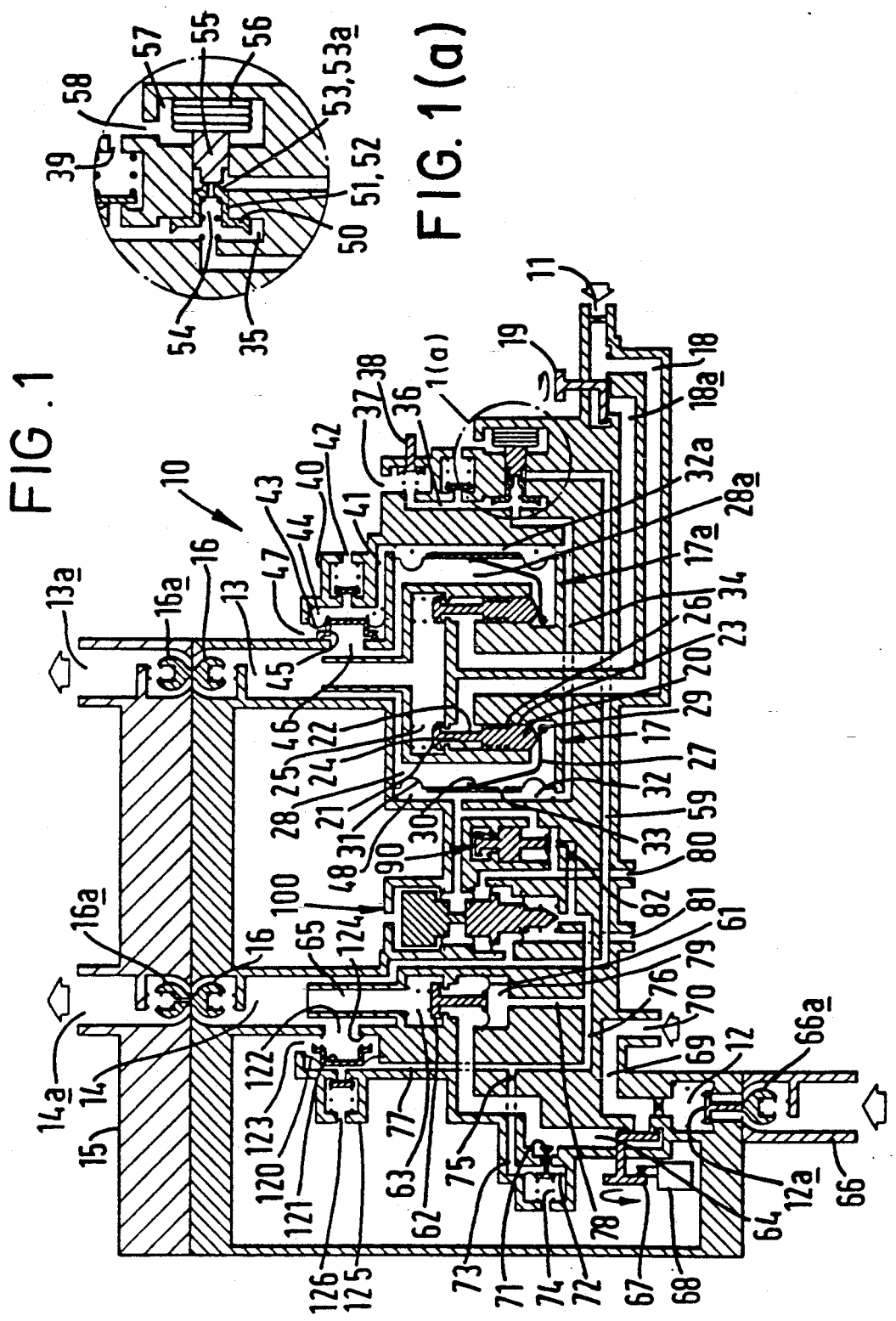
FIG. 1 is a diagramatic illustration of apparatus in accordance with one embodiment of the invention.
FIG. 1a is an enlarged view of the identified portion of FIG. 1.

FIG. 1 of the drawings illustrates diagramatically combined breathing demand regulator and G-protection trouser garment ("G-suit") inflation control apparatus in the form of a single seat-mountable unit 10 having a breathing gas inlet 11 and a G-suit inflation gas inlet 12, and outlets 13 and 14 for breathing gas and inflation gas, respectively, adapted for connection with corresponding inlets 13a, 14a of a personal equipment connector 15. The actual construction of the cooperating parts of the unit 10 and personal equipment connector 15 are not detailed in FIG. 1 because they conform with existing standards. For instance, as is customary, the outlets 13, 14 and inlets 13a, 14a incorporate self-sealing valve arrangements 16, 16a, respectively, that provide open communication through the outlets and complementary inlets when the connector 15 is attached to the unit 10, but which close to seal off the outlets and inlets upon detachment of the connector 15 from the unit. The cooperating parts of the unit 10 and connector 15 include provision for coupling communications and other services (not shown), such as de-misting air supplies, on the aircraft to the aircrew member and his personal equipment. The connector 15 may also include a suitable tapping (not shown) from the inlet 13a for connection to a chest counter-pressure garment ("jerkin") to provide for inflation of this by breathing gas to assist exhalation during positive pressure breathing.

The breathing gas inlet is adapted to receive oxygen-enriched air from a source of breathing gas such as, for example, a molecular sieve oxygen concentration system (not shown). Flow of oxygen-enriched air to the breathing gas outlet 13 is controlled by a demand-regulator arrangement comprising a main regulator 17 and a standby regulator 17a for use, for example, in the event of malfunction of the main regulator. Breathing gas from the inlet 11 flows to the main regulator by way of an inlet passageway 18 and to the standby regulator by way of an inlet passageway 18a, a selector valve 19 being provided for communicating one or the other of the inlet passageways 18, 18a with the breathing gas inlet 11. As the major components of the regulators 17, 17a are of the same design only the main regulator is here described in detail.

The main regulator 17 comprises a demand valve 20 having a valve head 21 supported by a spindle 22 from a spool 23 that slides in a bore 24 in the body of the unit 10. The valve head 21 is urged towards a closing position by a compression spring 25 acting on the valve head. Means such as an adjustment screw (not shown) may be provided for adjusting the thrust of the spring on the valve head. The opposed surfaces of the valve head 21 and the spool 23 are equal so that the valve 20 is balanced by the pressure of the oxygen-enriched air in the inlet passageway 18. The spool 23 is provided on its circumferential surface with grooves 26 in the manner of a labyrinth seal. The end surface of the spool opposite the end surface from which the spindle 22 projects is of conical form and projects from the bore 24 into contact with a valve operating lever 27 housed in a demand-pressure sensing chamber 28 and arranged to rock about one of its ends 29. The other end 30 of the lever 27 bears on the center of a diaphragm 31 that divides the demand-pressure sensing chamber 28 from a breathing-pressure control chamber 32.

The demand-pressure sensing chamber 28 is arranged to be open to pressure at the outlet 13 whilst the breathing-pressure control chamber 32 is arranged to receive a bleed of oxygen-enriched air from the demand-pressure sensing chamber through an orifice 33 in the diaphragm 31. The breathing-pressure control chamber 32 is arranged to be open to aircraft cabin pressure by way of a passageway 34, a chamber 35, a passageway 36 and an outlet 37. A press-to-test valve 38 and a press-to-test relief valve 39 are incorporated in the passageway 36. A valve arrangement provided with the chamber 35 and hereinafter described in detail, controls outflow of gas from the breathing-pressure in the breathing-pressure control chamber appropriate to providing positive pressure breathing at cabin altitudes above 12,000 meters or in the presence of high G-loads.

A maximum pressure relief valve 40 provides for venting of excess pressure from the breathing-pressure control chamber 32, via the passageway 34 and the breathing pressure control chamber 32a of the standby regulator 17a via a passageway 41 to a secondary outlet 42 to the aircraft cabin.

Pressure in the breathing-pressure control chamber 32 is applied, by way of passageway 41, to one side of a diaphragm 43 that together with a spring 44 acts to urge a valve head 45 carried by the diaphragm 43 towards closing communication between a vent port 46 in the outlet 13 and a secondary outlet 47 to the aircraft cabin and that enables oxygen-enriched air in the outlet 13 to be vented to aircraft cabin. The valve head 45 is arranged to open when the pressure in the outlet 13 is a prescribed amount higher than that in the breathing-pressure control chamber 32. Typically, the pressure differential required to open this pressure relief valve arrangement is 950 Pa (3.8 inches WG).

The diaphragm 31 is backed by a spring 48 located in the breathing-pressure control chamber 32. This spring acts on the diaphragm to urge it into contact with the lever 27 and the arrangement is such that the force balance of the springs 25 and 48 acting on the diaphragm 31 and demand valve 20 provides a null position for the diaphragm in which the valve head 21 is held off its seat sufficiently to maintain, in operation, a positive (safety) pressure of, say, 375 Pa (1.5 inch WG) in the outlet 13. Means (not shown) may be provided to negate the effort of spring 48 when the regulator is out of use, to prevent wastage of oxygen-enriched air by permitting the valve head 21 to close under the influence of spring 25.

As thus far described the main regulator 17 conforms in principle to the breathing regulator described in EP-A-0,263,677, and functions in similar manner. That is, with oxygen-enriched air available at the inlet 11 and the selector valve 19 switched to connect the inlet 11 with inlet passageway 18, the demand valve 20 responds by movement of the diaphragm 31 to phases of the breathing of an aircrew member wearing a mask attached to the outlet 13 via the connector 15. Breathing cycle pressure exists in the outlet 13 and thus in the demand-pressure sensing chamber 28, being sensed by the diaphragm. This moves to the right, as seen in the drawings, during inhalation so as to cause opening movement of the valve 20, whereas exhalation causes the diaphragm to move to the left to permit the valve 20 to close.

In this embodiment, however, the standby regulator 17a is provided. With the selector valve switched to connect the inlet 11 with the passageway 18 breathing cycle pressure will exist in the demand-pressure sensing chamber 17a of the standby regulator because of its connection with the outlet 13. Also, control pressure will exist in the breathing-pressure control chamber 32 because of its connection with the passageway 34. However, the standby regulator will not function to deliver oxygen-enriched air because there is no supply to its demand valve 20a. In the event of malfunction of the main regulator 17 the aircrew member switches the selector valve 19 to connect the inlet 11 with the passageway 18a so that oxygen-enriched air is delivered to the demand valve 20a and the stnandby regulator 17a then operates in the manner previously described with reference to the main regulator 17 but at a higher safety pressure of, say, 750 Pa (3.0 inches WG).

An important feature of the breathing regulator of the present invention is the valve arrangement provided with the chamber 35 as shown in FIG. 1. This valve arrangement comprises a valve head 50 located in the chamber 35 and carried by a stem 51 which slides in a bore 52 in the body of the unit 10. At an opposite end face 53 of the stem 51 a valve seat 53a is provided and a bore 54 extends through the stem between the valve seat 53a and the valve head 50. A loading member 55 carried by an aneroid capsule 56 is slidable in the bore 52 and is urged by expansion of the capsule 56 towards closing with the valve seat 53a. The aneroid capsule 56 is located in a chamber 57 which is open to aircraft cabin pressure by way of a port 58. The end face 53 of the stem 51 is communicated with pressure in the G-suit inflation gas outlet 14 by way of a passageway 59 which extends between the outlet 14 and the bore 52.

In operation of the breathing regulator, when the aircraft is flying highly accelerative manoeuvres which subject the aircrew member to G-load, G-suit inflation pressure present in the outlet 14, as will hereinafter be described, is sensed on the end face 53 of the stem 51 by way of the passageway 59. This pressure acts to move the valve-head 50 towards increasing the restriction to outflow from the breathing-pressure control chamber 32 to the outlet 37 to the aircraft cabin. This causes pressure in the chamber 32 to rise and increase the net pressure loading the diaphragm 31 and correspondingly the pressure in the outlet 13 and chamber 28. The demand valve 20 thus tends to maintain an increased pressure in the outlet 13 and, hence, in the breathing mask of the aircrew member. The increase in pressure in chamber 32 is also applied to the diaphragm 43 of the relief valve arrangement. By choice of the ratio of stem area 51 and head area 50 the required schedule of breathing pressure versus G-suit pressure may be obtained.

In similar manner, in the event of the cabin altitude rising above 12000 meters the aneroid capsule 56 expands to move the valve head 50 towards increasing the restriction to outflow from the chamber 32 to the outlet 37 and so result in a raising of the breathing gas pressure at outlet 13 thereby to maintain a physiologically acceptable level of oxygen partial pressure in the breathing gas supplied to the aircrew member during flight at cabin altitudes in excess of 12000 meters.

If a highly accelerative manoeuvre is flown with the cabin altitude in excess of 12000 meters, G-suit inflation pressure at outlet 14 is applied to the end face 53 of valve stem 51 and if this is such as to require an increase in breathing gas pressure over that set by expansion of the aneroid capsule 56 acting in series with, the valve head 50 is moved to further increase the restriction to outflow from the chamber 32 and, hence further increase the breathing gas pressure at outlet 13. However, in the event that cabin altitude is the higher of the two requirements the pressure on the end face 53 is ineffective. Thus, it will be appreciated that pressure in control chamber 32 and, hence breathing gas pressure at outlet 13 is set by the higher of the requirements for protection against the effects of altitude and G-load when the aircraft performs manoeuvres giving rise to G-load at altitudes in excess of 12000 meters.

For the reasons explained in EP-A-0, 263,677, the bore 54 in the stem 51 provides a supplemental control flow function effective to counteract the effects of sudden changes in G-load.

The unit 10 additionally comprises G-suit inflation control means that includes an inflation gas flow control valve member 60 (FIG. 2) carried by a diaphragm 61 and having a valve head 62 biased by a spring 63 towards closing an inflation gas supply passageway 64 extending from the inlet 12 and an inflation gas delivery passageway 65 connecting with the outlet 14. An inflation gas supply line 66 communicating with a source of pressurised gas such as, for example, pressurised air for the aircraft environmental control system derived from an engine compressor stage, is connected with the inlet 12. The construction of the cooperating parts of the supply line 66 and inlet 12 are not detailed in FIG. 1 because they conform with existing standards. As is customary, the inlet 12 and the supply line 66 incorporate self-sealing valve arrangements 12a and 66a, respectively, which cooperate to provide open communication when the supply line 66 is attached to the unit 10, but which close to seal off the supply line and the inlet upon detachment of the supply line. A shut-off valve 67 is provided for closing communication between the inlet 12 and the passageway 64. A shut-off valve position indicator 68 is provided for outputting a signal to the aircrew member when communication between the inlet 12 and the passageway 64 is closed. A secondary inflation gas supply passageway 69 from an inlet 70 communicates with the passageway 64 downstream of the shut-off valve 67. The inlet 70 is adapted for connection with a source of pressurised gas, for example a pressurised air bottle, which is carried on the aircrew seat (not shown). Sealing means (not shown) are provided on the air bottle and are adapted to be broken or opened when the aircrew member ejects from the aircraft so that if the aircraft altitude is in excess of 12000 meters it allows for G-suit inflation to protect against altitude in the normal manner during ejection. It will be appreciated that the non-return valve 12a closes the inlet 12 so that inflation air cannot escape therethrough following ejection.

A pressure reducing valve 71 carried by a diaphragm 72 maintains a stable supply pressure from the supply passageway 64 to a flow restrictor orifice 75 in a passageway 73 leading from the valve 71, in provision of a servo-flow for control purposes. The valve 71 is biased towards opening by the action of a spring 74 and aircraft cabin pressure on the face of the diaphragm opposite the valve 71.

The passageway 73 branches into passageways 76 and 77, and a branch passageway 78 from the passageway 76 connects with a chamber 79 which is defined in part by that face of the diaphragm 61 opposite the face which projects the valve member 60. The passageway 76 further connects with outlets 80 and 81 via first and second valve modules 90 and 100. Servo-pressure for control of G-suit inflation is regulated by the valve module 100 which acts to restrict outflow from the passageway 76 by way of outlet 81 to aircraft cabin. Initially however, the valve module 100 is prevented from setting servo-pressure at a level required for opening the flow control valve member 60 because servo-flow continues to be vented to aircraft cabin by way of the outlet 80. As acceleration increases and a load of 2 G is exceeded, the valve module 90 closes the outlet 80 and allows servo-pressure to immediately build to a level for opening the flow control valve member 60. In this embodiment this is aided by provision of a flow restrictor orifice 82 in the passageway 76 between the valve modules 100 and 90.

It should be appreciated that whilst in this embodiment the valve module 90 operates when a load of 2 G is exceeded, it may be designed for operation at any desired G-load.

Figure 2:
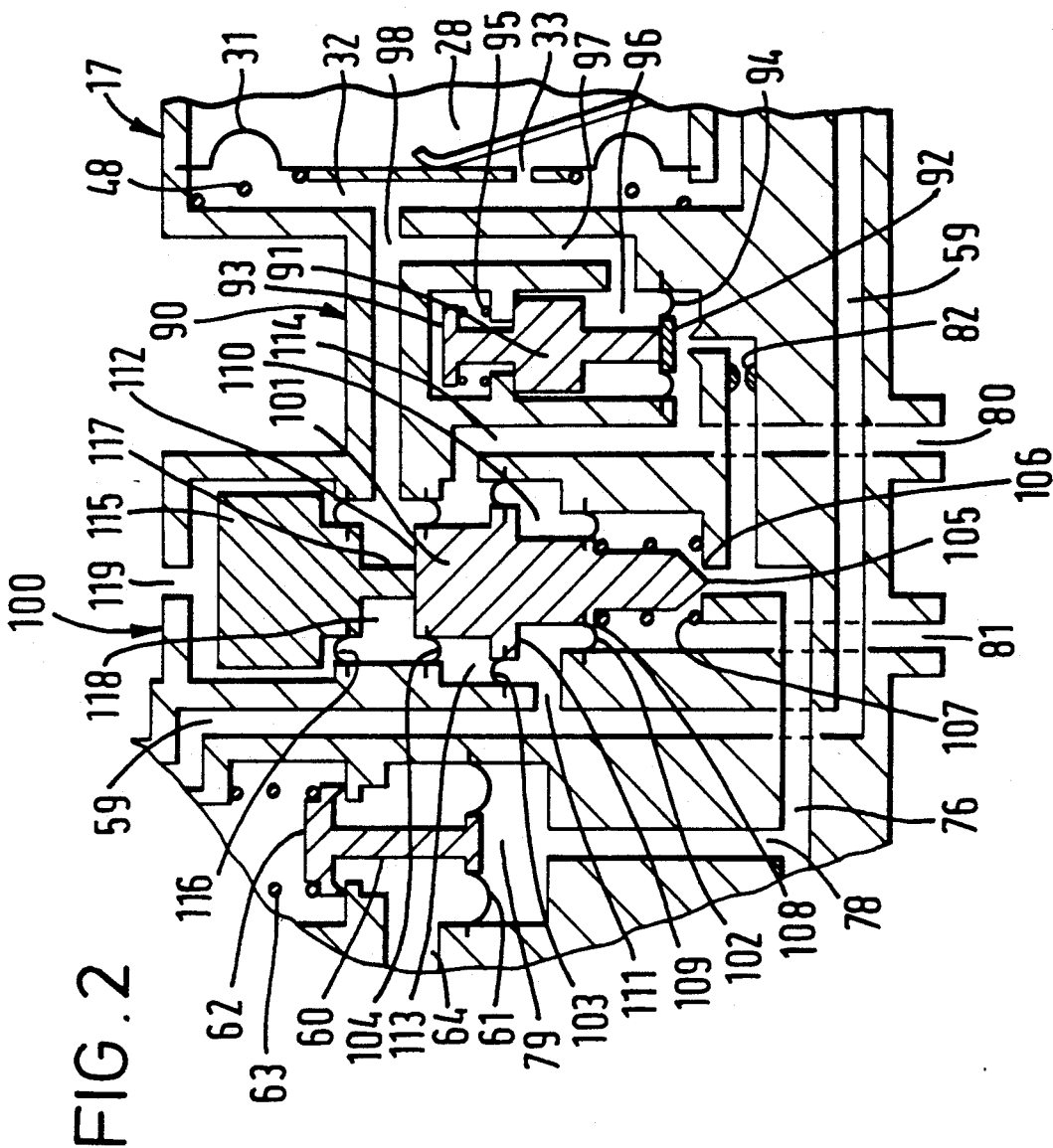
FIG. 2 is a diagramatic illustration on larger scale of two valve modules of the apparatus shown in FIG. 1.

With particular reference to FIG. 2, the first valve module 90 comprises an inertia mass 91 which projects from one end face a spigot into contact with a valve member 92 and a stem having a flanged head 93 from its opposite end face. The valve member 92 is supported by a diaphragm 94 whilst a spring 95 acts on the underface of the flanged head 93 to bias the inertia mass 91 to off-load the valve member 92. A chamber 96 defined at one end by the diaphragm 94 is connected with the breathing-pressure control chamber 32 of the main regulator 17 by a branch passageway 97 from a passageway 98. The inertia mass 91 is a loose fit in the body of the unit 10 so that pressure in the chamber 96 is balanced on opposite faces of the inertial mass 91 and the flanged head 93, and is effective only on the diaphragm 94. The force exerted by the spring 95 on the underface of the flanged head 93 is such as to bias the inertia mass 91 to off-load the valve member 92 so that the valve member is held by the stiffness of the diaphragm 94, or by a light spring (not shown), in a position in which the passageway 76 is connected with the outlet 80 until either a control pressure appropriate to providing positive pressure breathing is obtained in the breathing-pressure control chamber 32 which in turn loads diaphragm 94, or a 2 G acceleration is exceeded along the longitudinal axis of the valve module 90 so that the inertial force of the mass 91 overcomes the bias of the spring 95, at either of which occurences the valve member is moved to close connection between the passageway 76 and the outlet 80. It will be appreciated that the unit 10 is installed in an aircraft such that the longitudinal axis of the valve module 90 and, also, that of the valve module 100, is substantially aligned with the vertical axis of the aircraft whereby the valve modules are responsive to positive accelerations of the aircraft along that axis.

With continuing reference to FIG. 2, the second valve module 100 comprises a valve member 101 supported in the body portion of the unit 10 by three diaphragms 102, 103 and 104, respectively. The valve member has a needle end 105 which is adapted for progressively closing with a valve seat 106 provided on an outlet from the passageway 76 whereby the passageway 76 may be connected with the outlet 81 to aircraft cabin. A spring 107 acts between the body portion and the underface of a shoulder 108 provided on the valve member 101 to bias the needle end 105 away from the valve seat 106. The diaphragm 102 is attached to the valve member 101 near to the shoulder 108 on a portion of the valve member that is of larger diameter than the needle end 105. The diaphragm 103 is attached to a flange 109 spaced from the shoulder 108 along the length of the valve member 101. Opposed faces of the diaphragms 102 and 103 define with the body portion of the unit 10 a feedback chamber 110 which is connected by a passageway 111 with the passageway 59 so that G-suit inflation pressure at the outlet 14 is applied in the feedback chamber 110. The diaphragm 104 is attached to valve member 101 near to its end face 112 opposite the needle end 105. Opposed faces of the diaphragms 103 and 104 define with the body portion of the unit 10 a chamber 113 which is connected by a passageway 114 with the outlet 80 to aircraft cabin.

An inertia mass 115 is supported in the body portion by a diaphragm 116 and projects a spigot 117 towards contact with the end face 112 of the valve member 101. Opposed faces of the diaphragms 104 and 116 define with the body portion of the unit 10 a chamber 118 which is connected by passageway 98 with breathing-pressure control chamber 32. The opposite face of the diaphragm 116 and that end face of the inertia mass 115 opposite the end face projecting the spigot 117 are communicate with aircraft cabin pressure by way of a port 119 in the body portion of the unit 10.

The arrangement of the valve module 100 is such that pressure in the breathing regulator control chamber 32 is applied in the chamber 118 and acts on the diaphragm 104 to urge the valve member 101 towards closing the connection between the passage 76 and the outlet 81. At the same time this pressure acts also on the diaphragm 116 to null any action of the inertia mass 115 unless this mass is subject to an acceleration of magnitude and direction sufficient to overcome the pressure in the chamber 118 whereupon it acts on the end face of the valve member to move it towards closing the needle end 105 with the valve seat 106. The pressure in the G-suit is sensed in the feedback chamber 110 and urges the valve member 101 to move towards opening the needle end 105 away from the valve seat 106. The final condition of the valve module 100 is determined when the pressure in feedback chamber 110 is balanced by the net combination of breathing pressure in chamber 118 and inertial loading on the mass 115; thus providing a close loop feedback arrangement.

Referring again to FIG. 1, servo-pressure is applied also by way of the passageway 76 and the passageway 77, to one side of a diaphragm 120 and acts to urge a valve head 121 towards closing a vent port 122 provided in the outlet 14. The valve head 121 is biased by a spring 124 to open the vent port 122 to an outlet 123 to aircraft cabin whereby inflation gas is vented from the G-suit.

A maximum pressure relief valve 125 provides for excess servo-pressure to vent to aircraft cabin via a secondary outlet 126.

The present invention provides for servo-pressure controlling closing movement of valve head 121 and opening movement of the valve member 60 for inflation of the G-suit to be set by either of the requirements for protection at cabin altitude in excess of 12000 meters or protection against the effect of G-load. Moreover, the arrangement in accordance with the present invention ensures that when both conditions occur simultaneously the higher of the pressures required for inflation of the G-suit is delivered and that the effects of altitude and G-load are not additive.

In operation of the combined breathing demand regulator and G-suit inflation control means with oxygen-enriched air available at the inlet 11 and the selector valve 19 switched to communicate the inlet 11 with the main regulator 17, and with high pressure air available at the inlet 12 and the shut-off valve 67 switched to communicate the inlet 12 with the inflation gas supply passageway 64 to the control valve member 60, the main regulator 17 operates, as hereinbefore described, to supply oxygen-enriched air to the outlet 13 in response to the breathing demands of an aircrew member. If the aircraft cabin becomes decompressed such that the cabin altitude exceeds 12000 meters, the aneroid capsule 56 expands to move the valve head 50 towards increasing the restriction to outflow from the breathing-pressure control chamber 32 so that the control pressure in chamber 32 increases resulting in raising of the oxygen-enriched air pressure at the outlet 13. This pressure increase in the chamber 32 is sensed in chambers 96 and 118 of the valve modules 90 and 100, respectively, and is effective to move the valve members of these modules towards closing communication between the passageway 76 and the outlets 80 and 81, respectively. This results in a servo-pressure being built up in chamber 79 which is effective on the diaphragm 120 to urge the valve head 121 towards closing the vent port 122 in the outlet 14. This servo-pressure is applied also to the diaphragm 61 to overcome the bias of the spring 63 and move the valve member 60 and with it the valve head 62 to an open position so that pressurised air flows to the outlet 14 for inflation of the G-suit. The servo-pressure set by the valve module 100 is arranged to be such as to provide for inflation of the G-suit to a pressure which is typically three to four times that of the pressure of the oxygen-enriched air at the outlet 13. G-suit inflation pressure at the outlet 14 is applied to the valve head 62 and acts with the spring 63 to move the valve member 60 towards closing against the servo-pressure. G-suit inflation pressure is sensed also in feedback chamber 110 of the valve module 100 and, when this pressure balances the pressure in chamber 118, the valve member 101 is urged to lift the needle end 105 from the seat 106 so reducing the servo-pressure in the chamber 61 whereby the valve 60 is urged to close by the combination of the spring load 63 and the pressure in the outlet 65.

Figure 3:
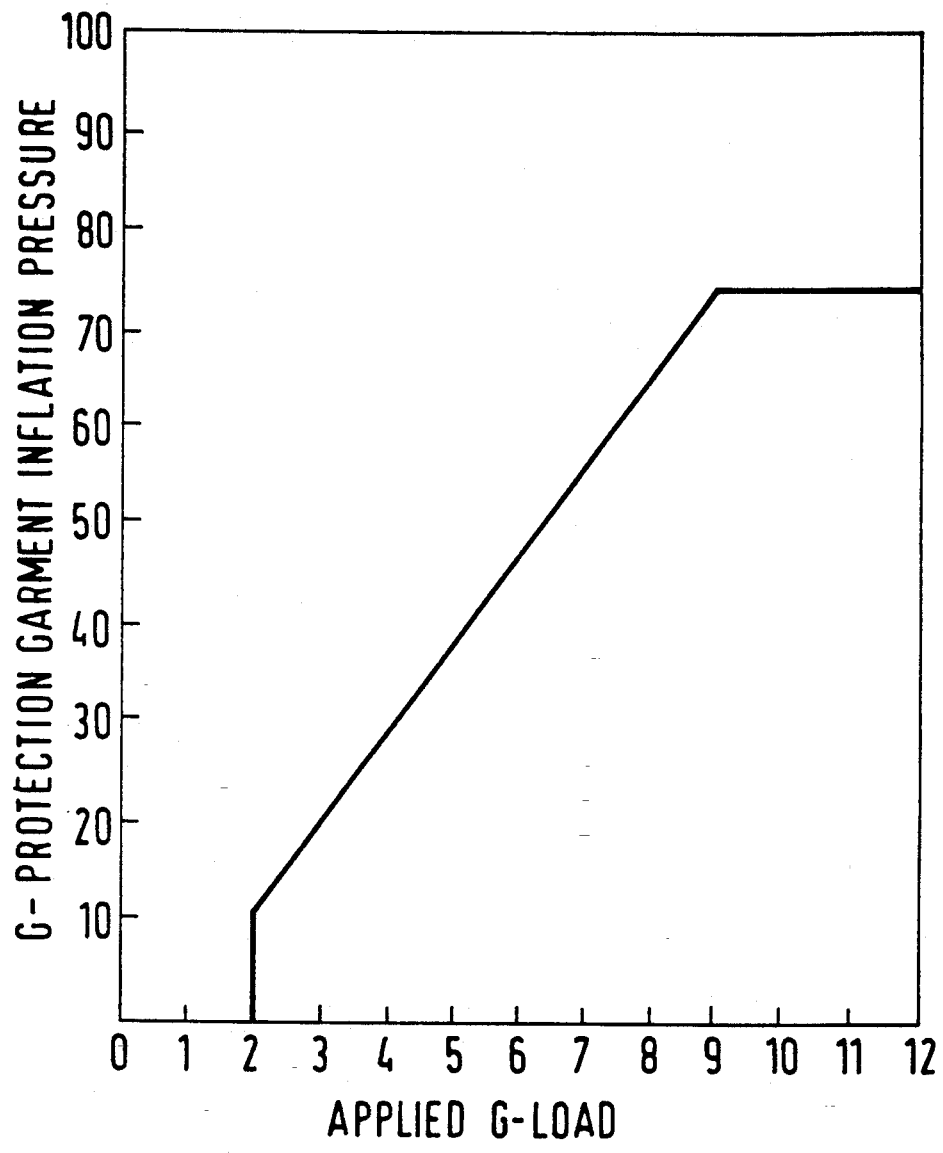
FIG. 3 is a graph showing desirable increase in G-protection trouser garment inflation pressure with increasing G-load.

At cabin altitudes below 12000 meters and with a load of one G, servo-flow is vented to aircraft cabin by way of the outlets 80 and 81. As acceleration along the aircraft vertical axis builds to impose a load above one G this is sensed by the inertia mass 115 which acts on the valve member 101 to cause the needle end 105 to commence to close with the valve seat 106 thereby increasingly restricting venting of servo-flow through the outlet 81. As the load builds towards 2 G the needle end is closed, or very nearly closed, with the valve seat and, because the outflow through the other outlet 80 is choked by the restrictor orifice 82, the servo-control system is pre-charged to a level just below that required for servo-pressure on the diaphragm 61 of the valve member 60 to overcome the bias of the spring 63. When the load exceeds 2 G this is sensed by the inertia mass 91 of the valve module 90 as a force which is effective to overcome the bias of spring 95 and the inertia mass 91 moves the valve member 92 in the manner of a switch to close connection between the passageway 76 and the outlet 80 so that servo-pressure is immediately built-up to a level that is effective to move the valve head 121 towards closing the vent port 122 and the valve member 60 towards opening so that pressurised air flows to the outlet 14 whereby the G-suit is inflated to a first predetermined pressure as is shown by the graph of FIG. 3. G-suit inflation pressure is sensed in feedback chamber 110 of the valve module 100 and, when this pressure balances the inertial load applied by the mass 115, the valve member 101 is urged to lift the needle valve 105 from the seat 106 so reducing the servo-pressure in the chamber 61 whereby the valve member 60 is urged to close by the combination of the spring load 63 and the pressure in the outlet 65. As load continues to build above 2 G the valve module 100 is moved by the inertial loading of the inertia mass 115 to further increase the servo-pressure so that G-suit inflation pressure is increased at a steady rate as is shown by the slope of the graph of FIG. 3. Operation of the valve modules 90 and 100 provide a desirable feature whereby in the presence of increasing G-load the protection garment is rapidly inflated to an initial pressure when a load of 2 G is exceeded and the inflation pressure is thereafter increased at a steady rate with increasing acceleration. At the same time pressure in the outlet 14 is applied by way of passageway 59 to the back face 53a of the valve stem 51 and is effective to move the valve head 50 towards restricting outflow from breathing-pressure control chamber 32 whereby pressure in chamber 32 is increased in obtainment of positive pressure breathing for further protection of the aircrew member against the effect of G-load.

In the event that the aircrew member is subjected to G-load following cabin decompression with the aircraft operating at cabin altitudes in excess of 12000 meters, G-suit inflation pressure at the outlet 14 and oxygen-enriched air pressure at the outlet 13 is set at the higher of the requirements for protection against G-load and altitude. If altitude gives rise to the higher requirement the aneroid capsule 56 expands to move the valve head 50 to set the pressure in the breathing-pressure control chamber 32 in obtainment of positive pressure breathing. Pressure in the chamber 32 applies also in the chambers 96 and 118 of the valve modules 90 and 100, respectively, and acts to move the valve members of these modules to close communication between the passageway 76 and the outlets 80 and 81, respectively, whereby the G-suit is inflated as hereinbefore described. At the same time, pressure in chamber 118 is effective to null the action of the inertia mass 115 until such time as increasing acceleration gives rise to a G-load which results in a force on the inertia mass 115 that overcomes the effect of the pressure in the chamber 118 and moves the inertia mass into contact with the valve member 101. Servo-pressure is then that set by the action of the inertia mass 115 so that the G-suit inflation pressure is increased to protect the aircrew member against the higher requirement for protection against G-load. This increased inflation pressure is then applied to the end face 53 to move the valve head 50 towards further restricting the outflow from chamber 32 so that the pressure of the oxygen-enriched air available for breathing at the outlet 13 is further increased in protecting the aircrew member against the higher positive pressure breathing requirement set by G-load.

FIGS. 4 and 4a illustrate a modified form of the apparatus shown in FIG. 1 and 1(a). In describing these modifications like elements of the apparatus will be given like reference numerals.

The first modification is seen in the valve arrangement provided with the chamber 35 where the valve stem 51 which carries the valve head 50 and the loading member 55 carried by the aneroid capsule 56, are supported by diaphragms 130 and 131, respectively, rather than being sliding fits in the bore 52 in the body of the unit 10.

The second modification is found in the arrangement of the shut-off valve 67 and the inflation gas supply passageway 64. A vent outlet 132 to aircraft cabin is provided in the passageway 64 and the shut-off valve 67 is movable between a position in which it closes communication between the inlet 12 and the passageway 64 in which case the outlet 132 is open to aircraft cabin, and a position in which it closes the outlet 132 in which case the inlet 12 is communicated with the passageway 64. This feature provides a means for rapidly decaying servo-pressure by opening the outlet 132 so that the valve head 121 is rapidly moved to a position opening the vent port 122 whereby the G-suit is quickly deflated.

A further modification is provision of a cylindrical cup member 133 supported from the body of the unit 10 for housing the spring 63 which acts on the valve head 62 to urge the valve member 60 towards closing. A drilling 134 is provided in the closed end of the cup member 133 whereby G-suit inflation pressure at the outlet 14 may be fed back to the valve head 62 as it closes with the cup member 133. The cup member provides a chamber in which a stable pressure applies because it is protected from the turbulent airflow which exists in the passageway 65.

Another possible modification, not illustrated in FIG. 4, is that the valve members of the valve modules 90 and 100, together with the inertia mass 115 of the valve module 100, may be sliding fits in the body of the unit 10 rather than being carried by diaphragms.

What is claimed is:

1. An aircraft breathing demand regulator adapted to be connected with a breathing gas source for regulating delivery of breathing gas to a breathing mask in response to breathing demands of the aircrew member, the regulator including a breathing-pressure control chamber fed with gas to develop a control pressure therein determining the breathing gas pressure delivered by the regulator, aneroid means for controlling outflow from the control chamber to increase breathing gas pressure appropriate to positive pressure breathing above a predetermined aircraft cabin altitude, and valve means for controlling outflow from the control chamber to increase breathing gas delivery pressure appropriate to positive pressure breathing in the presence of high or rapidly changing G-load, the aneroid means coacting with the valve means which said valve means includes a valve head which is substantially in series with the aneroid means so as to be moved by expansion of the aneroid means towards restricting outflow from the control chamber such that in the presence of G-load above said predetermined aircraft cabin altitude the valve means is moved to control outflow from the control chamber to increase breathing gas delivery pressure appropriate to protection against the higher of the altitude and G-load requirements.

2. A breathing demand regulator according to claim 1, wherein the valve head is carried by a valve stem having an end face opposite the valve head adapted for communication with a pneumatic signal representative of inflation pressure in a G-suit worn by the aircrew member.

3. A breathing demand regulator according to claim 2, wherein the aneroid means is adapted to act on the end face of the valve stem for movement of the valve head at altitude causing expansion of the aneroid means.

4. A breathing demand regulator according to claim 3, wherein the aneroid means acts on the valve stem through a loading member.

5. An aircraft aircrew life support system comprising a breathing demand regulator adapted to be connected to a breathing gas source for regulating delivery of breathing gas to a breathing mask in response to breathing demands of the aircrew member, and, if required, to a chest counter-pressure garment, the regulator including a breathing-pressure control chamber fed with gas to develop a control pressure therein determining the breathing gas pressure delivered by the regulator, aneroid means for controlling outflow from the control chamber to increase breathing gas pressure appropriate to positive pressure breathing above a predetermined aircraft cabin altitude, and valve means for controlling outflow from the control chamber to increase breathing gas delivery pressure appropriate to positive pressure breathing in the presence of high or rapidly changing G-load, the aneroid means coacting with the valve means which said valve means includes a valve head which is substantially in series with the aneroid means so as to be moved by expansion of the aneroid means towards restricting outflow from the control chamber such that in the presence of G-load above said predetermined aircraft cabin altitude the valve means is moved to control outflow from the control chamber to increase breathing gas delivery pressure appropriate to protection against the higher of the altitude and G-load requirements; anti-G valve means and G-suit inflation pressure control means responsive thereto for outputting inflation gas to the G-suit; and means for outputting a pneumatic signal representative of G-suit inflation pressure to the valve means controlling outflow from the breathing pressure control chamber for movement of the valve means in the presence of G-load.

6. A system according to claim 5, wherein the anti-G valve means comprises first anti-G valve means including an inertia mass responsive when G-load exceeds a predetermined level to cause rapid inflation of the G-suit to a first pressure and second anti-G valve means including an inertia means responsive to increasing G-load for controlling G-suit inflation pressure to increase at a steady rate with increasing G-load above said predetermined level.

7. A system according to claim 6, further comprising means for applying breathing regulator control chamber pressure to the first and second anti-G valve means for inflation of the G-suit in the absence of G-load above said predetermined aircraft cabin altitude, whereby said pressure acts to null the effect of the inertia mass of the second valve means when the requirement for protection against altitude is higher than for protection against G-load.

8. A system according to claim 6, wherein the first and second anti-G valve means control servo-pressure of a servo-valve arrangement controlling inflation of the G-suit.

9. A system according to claim 8, wherein the servo-valve arrangement comprises an inflation gas flow control valve member adapted for opening under the action of servo-pressure to communicate an inflation gas inlet with an inflation gas outlet whereby inflation gas flows to the outlet for inflation of a G-suit connected to the outlet, and a G-suit vent valve member adapted for closing under the action of servo-pressure with a vent port in the outlet whereby when the vent valve member is in an open position the G-suit is vented to atmosphere.

10. A system according to claim 6, wherein the first anti-G valve means comprises a valve member carried by a diaphragm, an inertia mass biased by a spring to off-load the valve member below the predetermined level of G-load, and means for sensing breathing regulator control chamber pressure on that side of the diaphragm facing the inertia mass.

11. A system according to claim 6, wherein the second anti-G valve means comprises a valve member supported by a plurality of diaphragms and having a valve head at one end thereof, an inertia mass supported by a diaphragm and adapted for acting against an end face of the valve member opposite the valve head for movement of the valve member under influence of increasing acceleration, means for sensing breathing regulator control chamber pressure in a chamber defined between the inertia mass supporting diaphragm and an end one of the valve member supporting diaphragms, a spring acting to bias the valve member towards an open position, and means for sensing G-suit inflation pressure and for using this pressure as a feedback force for movement of the valve member in opposition to the resultant of the inertial force on the inertia mass and the force applied by pressure in the chamber defined between the inertia mass supporting diaphragm and the end one of the valve member supporting diaphragms.

* * * * *